(12) United States Patent
Balasubramanian et al.

(10) Patent No.: US 6,617,065 B2
(45) Date of Patent: Sep. 9, 2003

(54) METHOD AND APPARATUS FOR MAINTAINING NEUTRAL WATER BALANCE IN A FUEL CELL SYSTEM

(75) Inventors: Bhaskar Balasubramanian, West Palm Beach, FL (US); Frano Barbir, Palm Beach Gardens, FL (US); Jay K. Neutzler, Palm Beach Gardens, FL (US)

(73) Assignee: Teledyne Energy Systems, Inc., Hunt Valley, MD (US)

( * ) Notice: Subject to any disclaimer, the term of this patent is extended or adjusted under 35 U.S.C. 154(b) by 0 days.

(21) Appl. No.: 09/903,044

(22) Filed: Jul. 11, 2001

(65) Prior Publication Data

US 2003/0031902 A1 Feb. 13, 2003

(Under 37 CFR 1.47)

Related U.S. Application Data

(63) Continuation of application No. PCT/US00/00823, filed on Jan. 12, 2000.
(60) Provisional application No. 60/115,571, filed on Jan. 12, 1999.

(51) Int. Cl.[7] .................................................. H01M 8/04
(52) U.S. Cl. .............................. 429/13; 429/24; 429/25; 429/26
(58) Field of Search .............................. 429/13, 23, 24, 429/25, 26, 30

(56) References Cited

U.S. PATENT DOCUMENTS

| | | | | |
|---|---|---|---|---|
| 5,200,278 A | * | 4/1993 | Watkins et al. | 429/24 |
| 5,316,870 A | * | 5/1994 | Ohga | 429/24 |
| 5,503,944 A | * | 4/1996 | Meyer et al. | 429/13 |
| 5,837,393 A | * | 11/1998 | Okamoto | 429/20 |
| 5,853,909 A | * | 12/1998 | Reiser | 429/13 |
| 5,965,288 A | * | 10/1999 | Okamoto | 429/26 |
| 6,015,634 A | * | 1/2000 | Bonville, Jr. et al. | 429/24 |

* cited by examiner

Primary Examiner—Bruce F. Bell
(74) Attorney, Agent, or Firm—Akerman Senterfitt

(57) ABSTRACT

In a fuel cell system, sufficient water to supply the consumption needs of the system, particularly by the system humidifiers and fuel processor, can be obtained from the exhaust of the fuel cell stack without the use of a condenser, by controlling the operating temperature of the fuel cell stack. The operating temperature can be controlled, for example, using a controller that monitors water level in the process water reservoir and increases or decreases the operating temperature through control of the fuel cell cooling system to maintain the water level within a predetermined range representative of neutral water balance in the system.

8 Claims, 6 Drawing Sheets

METHOD AND APPARATUS FOR MAINTAINING NEUTRAL WATER BALANCE IN A FUEL CELL SYSTEM

CROSS REFERENCE TO RELATED APPLICATIONS

This is a continuation application of PCT International Application No. PCT/US00/00823, filed Jan. 12, 2000 and published in English on Jul. 20, 2000, claiming the priority of U.S. Patent Application Serial No. 60/115,571, filed Jan. 12, 1999.

FIELD OF THE INVENTION

This invention relates generally to fuel cells, and more particularly to a method of maintaining a neutral water balance in a fuel cell for an automobile.

BACKGROUND OF THE INVENTION

In automotive systems incorporating fuel cells, it is important to maintain neutral water balance so that the vehicle does not run out of process water in the event of net water consumption. Generally, automotive fuel cell systems require a condenser at the exhaust in order to recover process water and maintain a neutral water balance in the cell. Condensers are relatively large and occupy a substantial volume in such systems. Accordingly, it would be desirable to provide a method for operating a fuel cell in which neutral water balance can be maintained without the need for a condenser.

SUMMARY OF THE INVENTION

It is therefore an object of the invention to provide a fuel cell assembly that minimizes breakdown and damage due to fuel cell water depletion.

It is a further object of the invention to maintain sufficient water content while operating the fuel cell in an efficient manner.

It is an even further object of the invention to optimize performance while maintaining sufficient water content.

It is a still further object of the invention to reduce overall weight and space requirements for a fuel cell while maintaining sufficient water content in the fuel cell.

It is still another object of the invention to simplify the support system for a fuel cell while maintaining sufficient water content in the fuel cell.

These and other objects of the invention are achieved by a fuel cell assembly that includes a water balance control system that effects water production or consumption by a fuel cell necessary to return to a balanced state within the fuel cell. The water balance control system causes such production or consumption through adjustment of the fuel cell operating temperature. The fuel cell operating temperature can be adjusted by controlling the degree of heat transfer from the fuel cell coolant. Preferably, this heat transfer is controlled through a fan cooled radiator in the coolant loop.

The water balance control system can make the necessary temperature adjustments in response to one or more of a variety of factors that are indicative of the water balance state of the fuel cell. In one embodiment of the invention, a fuel cell system is operated at a reduced temperature, for example approximately 58.5° C. at 30 psig under ambient conditions of 30 degrees C., 60% R.H. and 1 atm pressure, enabling the system to recover more water directly from the fuel cell and thereby eliminate the need for a condenser to recover water from the exhaust gases in the automotive system.

In a further embodiment of the invention, the fuel cell operating temperature is varied in response to measured ambient conditions (such as temperature, pressure and relative humidity) with closed loop water balance in response to load with respect to operating conditions, such as load, stack temperature and stack pressure. For example, the fuel cell operating condition can be adjusted to maintain water level in a reservoir within a predetermined range. The invention can also incorporate a combination of the approaches.

A main advantage is the elimination of a condenser and any associated fan, with a corresponding reduction in system size, complexity and parasitic load. Another advantage of lower fuel cell operating temperatures is that the amount of water needed to humidify the cathode air is reduced. Thus, the heat generated from compressed air and the reformer excess water (or downlet) can be sufficient to vaporize the water and directly humidify the cathode air.

BRIEF DESCRIPTION OF THE DRAWINGS

A greater understanding of the invention can be gained by a reading of the detailed description of the invention as now set forth with reference to the accompanying drawings, in which.

DETAILED DESCRIPTION OF THE PREFERRED EMBODIMENTS

A fuel cell system, according to the invention, acts to maintain a neutral water balance in a water loop that includes a humidifier, fuel cell stack, separators, water reservoir or tank, and water pump. As used throughout this application, neutral water balance refers to the ability of the fuel cell system to produce in the oxidant and fuel exhaust of the fuel cell stack sufficient liquid water to satisfy the water consumption needs of the system, particularly the water consumption by the intake air humidifier and the fuel processor.

The fuel cell system maintains the neutral water balance without the need for a condenser to recover water from the gases exhausted from the fuel cell stack. One technique to eliminate the need for a condenser and still maintain neutral water balance is to maintain the fuel cell stack operating temperature below a certain temperature. A second technique is with the use of a control system to regulate the operating temperature of the fuel cell stack. The control system uses measured parameters from the fuel system, such as water reservoir level, water temperature, and power load drawn from the fuel cell, to determine and control the desired removal rate of heat from the system which thereby controls the operating temperature of the fuel cell stack.

Figure 1:
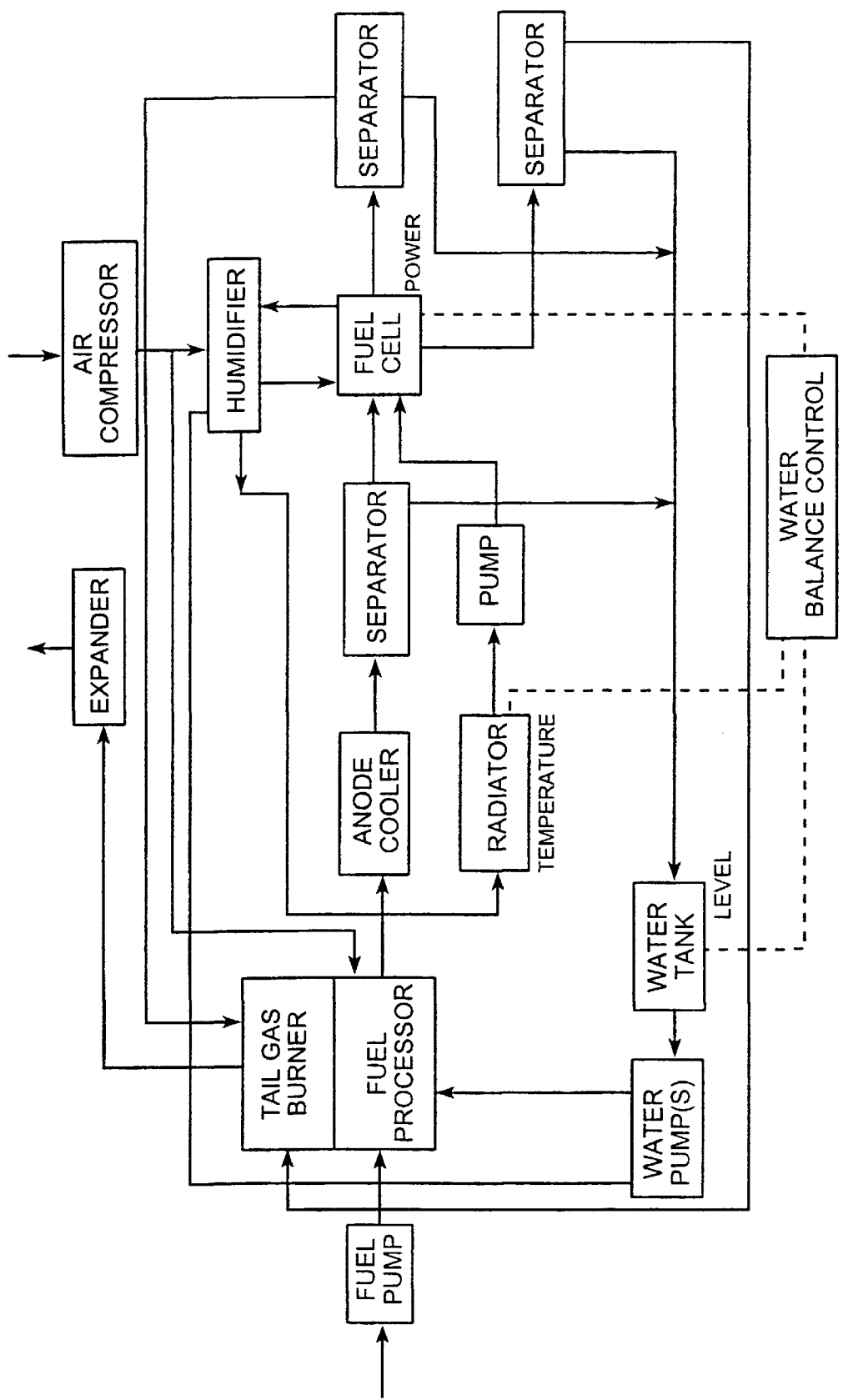
FIG. 1 is a block diagram of a fuel cell system without a condenser, in accordance with a preferred embodiment of the present invention.

Referring to FIG. 1, a fuel cell system according to one embodiment of the invention is shown. The fuel cell system includes a humidifier, radiator, water pump, and fuel cell stack. Advantageously, the fuel cell system does not require a condenser to recover water from the exhaust gases from the fuel cell stack to maintain neutral water balance.

The fuel cell system includes several fluid paths such as a fuel cell coolant path 20, an air path 40, a fuel path 60, an exhaust path 80, and a water supply path 100. The fuel cell coolant path 20 is a loop of coolant that includes a humidifier 22, a radiator 24, a pump 26, and a fuel cell 28. The radiator 24 cools the temperature of the coolant to a desired operating temperature of the fuel cell 28. The coolant exiting the radiator 24 is then pumped to the fuel cell 28 via the coolant pump 26. The coolant in the fuel cell 28 is used to regulate the fuel cell stack temperature. The coolant from the fuel cell 28 exits to the humidifier 22 for heat exchange. From the humidifier 22, the coolant returns to the radiator 24 for cooling.

The air path 40 initiates with air being pumped via air compressor 42 into the humidifier 22 at a desired operating pressure. The humidifier 22 evaporates water to obtain a desired humidity, and the air/water mixture is then introduced into the fuel cell 28. The air compressor 22 also pumps air into the fuel processor 64.

The fuel path 60 extends from the fuel pump 62 into the fuel processor 64. The fuel processor 64 introduces water into the fuel to form a hydrogen rich gaseous fuel mixture. The resulting fuel mixture then flows from the fuel processor 64 to the anode cooler 66, which reduces the temperature of the fuel mixture. Once the fuel mixture is cooled, excess water is separated off from the fuel mixture with an inlet separator 68. The remaining fuel mixture is then introduced into the fuel cell 28.

A pair of exhaust paths 80a, 80b exit the fuel cell 28. The first exhaust path 80a exhausts the air/water mixture from the fuel cell 28 into an air exhaust separator 82 to separate water from the air. The water from the air exhaust separator 82 is then returned to a water tank 84, and the air from the air exhaust separator 82 is introduced into a tail gas burner 86. The second exhaust path 80b exhausts the fuel mixture from the fuel cell 28 into a fuel exhaust separator 88 to separate water from the fuel mixture. The water from the fuel exhaust separator 88 is returned to the water tank 84, and the remaining fuel mixture from the fuel exhaust separator 88 is introduced into the tail gas burner 86. The tail gas burner 86 combusts the exhaust gases from the exhaust separators 82, 88, which can outlet to an optional expander 92.

The water supply path 100 is a loop of water that includes the water tank 84, a water pump 102, and the fuel processor 64. Water from the water tank 84 is pumped via water pump 102 into the fuel processor 64. The water pump 102 also pumps water from the water tank 84 to supply the humidifier 22. The water tank 84 also receives water from the exhaust separators 82, 88 and the inlet separator 68. Optionally, depending on the fuel processor used, the water tank 84 can further receive water from the fuel processor.

Figure 2:
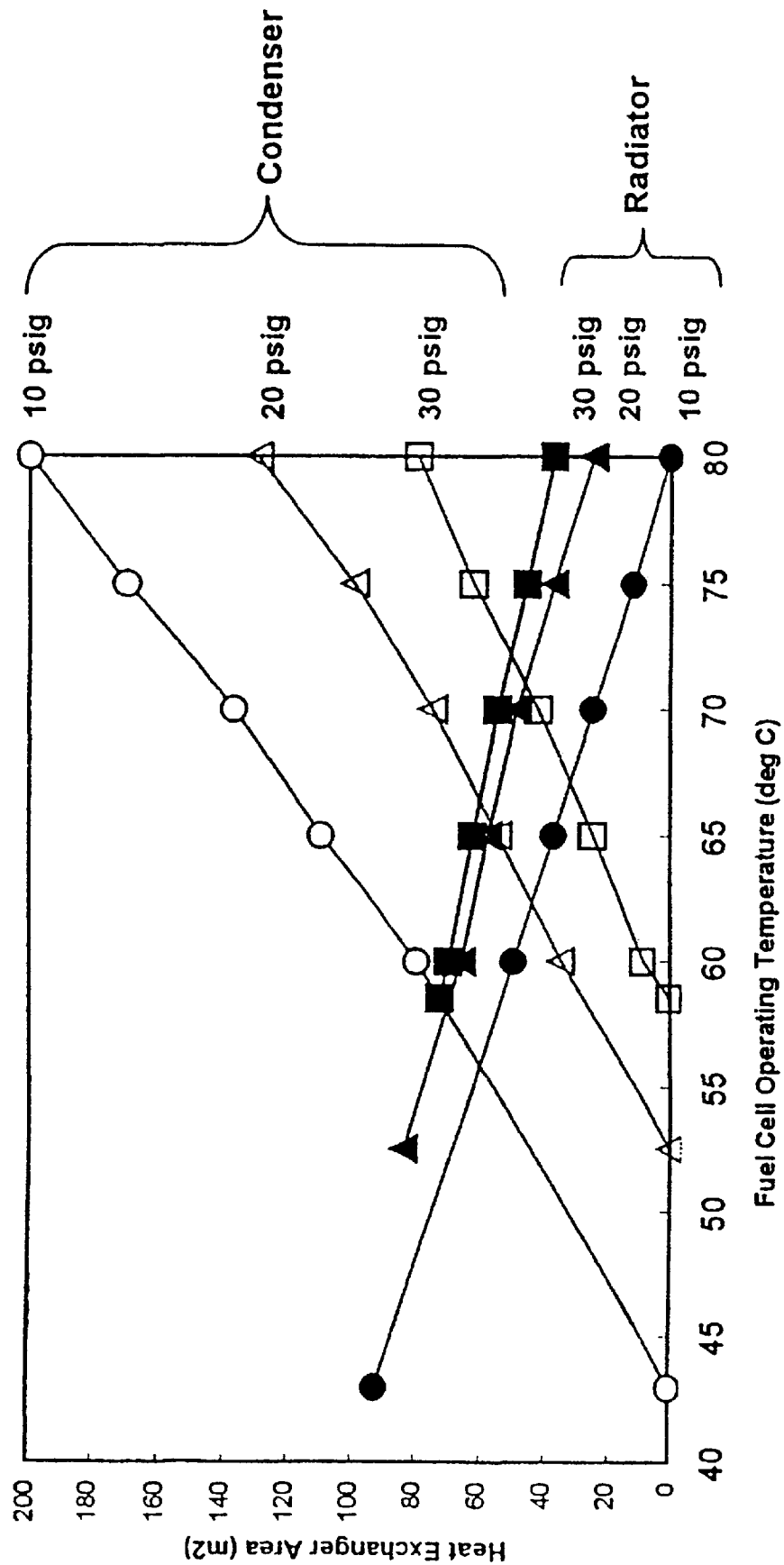
FIG. 2 is a graphical representation of heat exchange area versus operating temperature at various system pressures.
Figure 3:
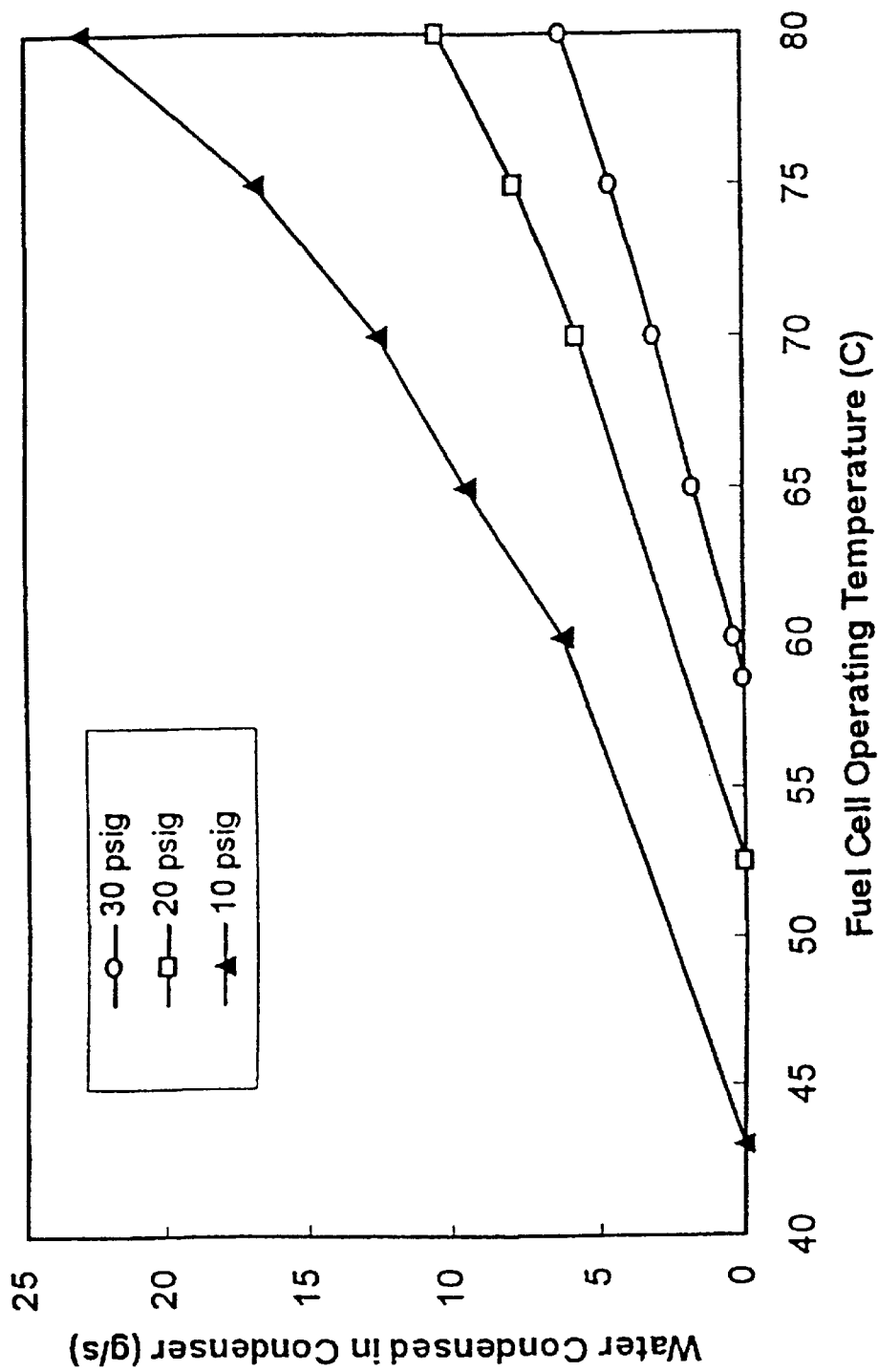
FIG. 3 is a graphical representation of water collection in a condenser versus operating temperature at various system pressures.

FIG. 2 illustrates experimental data showing that as the operating temperature of the fuel cell stack is reduced, the surface area required for a condenser to condense sufficient water vapor from the fuel cell stack exhaust to maintain neutral water balance is also reduced. Thus, for a given operating pressure, as the operating temperature is reduced to a certain point, the surface area required for a condenser approaches zero: and therefore, the need for a condenser is eliminated. As illustrated in FIG. 2, the surface area for the condenser also varies as a function of pressure at a given temperature. As operating pressure increases, the temperature, at which the need for a condenser is eliminated, also increases. So, for example, if the operating pressure is 30 psig, an temperature to eliminate the need of a condenser for maintaining neutral water balance is approximately 58.5° C., for ambient conditions of 21 degrees C., 1 atm pressure and 60% R.H.

Neutral water balance is accomplished via control systems that monitor ambient parameters such as temperature, pressure and relative humidity and fuel cell system parameters such as load, operating pressure and temperature as well as humidification and fuel processor requirements. The control system regulates the fuel cell temperature in the system to obtain neutral water balance. At a given system configuration, once the operating temperature increases above a certain level, the fuel cell system begins to lose water via vapor water in the exhaust gas stream. Conversely, once the operating temperature decreases below a certain level, the fuel cell system begins to gain water because a lower temperature in the fuel cell stack increases the rate of water condensation.

In a preferred embodiment, the control system acts to control neutral water balance by controlling the rate at which heat is removed from the fuel cell system. Increasing the amount of heat removal from the fuel cell system increases the amount water condensation or decreases the amount of water evaporation from the system. Alternatively, decreasing the amount of heat removal from the fuel cell system decreases the amount of water condensation or increases the amount of water vapor exhaust from the system.

Various mechanisms of controlling the heat removal rate from radiators are well known in the art, and any of these mechanisms are acceptable for use with the invention. In a preferred embodiment, the heat removal rate is controlled by controlling the operation of a fan on the radiator. By turning the fan on or by increasing the speed of the fan, the heat removal rate of the radiator can be increased. Alternatively, by turning off the fan or by decreasing the speed of the fan, the heat removal rate of the radiator can be decreased.

Although any parameter capable of indicating neutral water balance or operating temperature can be used to indicate whether the heat removal rate of the system can be increased, decreased, or can remain the same, the preferred embodiment of the invention can include any combination of two main parameters. The first parameter is the water level within the water reservoir. The second parameter is the temperature of the coolant to the fuel stack. Other parameters such as ambient conditions (pressure, temperature and relative humidity) and operating conditions such as fuel cell stack pressure, temperature, humidification, load and fuel processor requirements can also be used.

The measurement of the water level is not limited as to a particular location. In the preferred embodiment, a water balance control device can receive signals from a level sensor connected to the water reservoir. The sensor can monitor whether the water level is in a predetermined range sufficient to supply the water consumption needs of the system. If the signal indicates that the level has fallen below a minimum level in the range, the water balance control device, such as a digital computer, can generate a signal to reduce the operating temperature of the fuel cell stack, by operating the cooling fan of the radiator.

Additionally, the invention is not limited as to the method or equipment of measuring the water level. For example, the water level can be measured via a variable probe or alternatively, the water level can be indicated only after the water level reaches a high or low level.

The control system can also operate in conjunction with the measurement of the water level by increasing or decreasing the heat removal rate of the system as the water reaches a certain level. For example, if the water level is too low, the control system will increase the rate of heat removal from the system. Alternatively, if the water level is too high, the control system will increase the rate of heat removal from the system. In so doing, the control system acts to maintain a desired water level in the system. The desired water level in the system is determined by the requirements of the water consumers, namely, the fuel processor and the humidifier balanced against the production of water from the fuel cell stack, together with the loss of water vapor in the fuel cell exhaust at a temperature appreciably favorable for fuel cell reaction kinetics.

The advantage of the control system measuring water level is relative simplicity in control and measurement devices.

The measurement of the operating temperature is not limited as to a particular location. Illustrative examples include measuring the water temperature as the water leaves the fuel cell, before the water enters the radiator, or after the water leaves the radiator.

The control system can also operate in conjunction with the measurement of ambient conditions and operating conditions by increasing or decreasing the heat removal rate of the system in a predictive mode. At a given temperature, as the amount of power drawn from the system is decreased, the system loses water. Alternatively, at a given temperature, as the amount of power drawn from the system is increased, the system gains water. Therefore, if the power load is increased, the control system will decrease the rate of heat removal from the system. Alternatively, if the power load is decreased, the control system will increase the rate of heat removal from the system. In so doing, the control system acts to maintain a desired water balance of the system. Because the amount of water lost or gained in the system may not be a linear function of the power load, an algorithm correlating the power load to the required rate of heat removal from the system may have to be incorporated into the control system.

An added advantage of the control system monitoring the power load is the ability of the control system to accommodate higher than normal load requirements. By elevating the stack temperature above a designated temperature (which is a function of ambient air temperature and humidity), the system is able to produce more power. However, the system also loses water. This lost water could be replenished by reducing the stack temperature below the aforementioned designated temperature. However, the reduction of the stack temperature effects a corresponding reduction in the power output.

By having a control system that measures the power load drawn from the fuel cell, the algorithm in the control system can advantageously delay the reduction in stack temperature until power load drawn from the fuel cell is decreased. Thus, the control system is both capable of maintaining neutral water balance and still allow for situations in which increased power consumption is required.

A further advantage of the invention is that at lower fuel cell operating temperature, the amount of water needed to humidify the cathode air is reduced. Therefore, the humidifier requires a reduced amount of heat to generate the level of humidity necessary for the cathode air. As such, the heat generated from compressed air and the reformer excess water (or downlet) is sufficient to vaporize the water and directly humidify the cathode air. In contrast, a conventional humidification process requires additional heat (such as that from the cooling loop as depicted in FIG. 1) to vaporize the water in the air stream. However, at the lower fuel cell operating temperature of the instant method, humidification is simplified and the need for additional heat is precluded.

Figure 4:
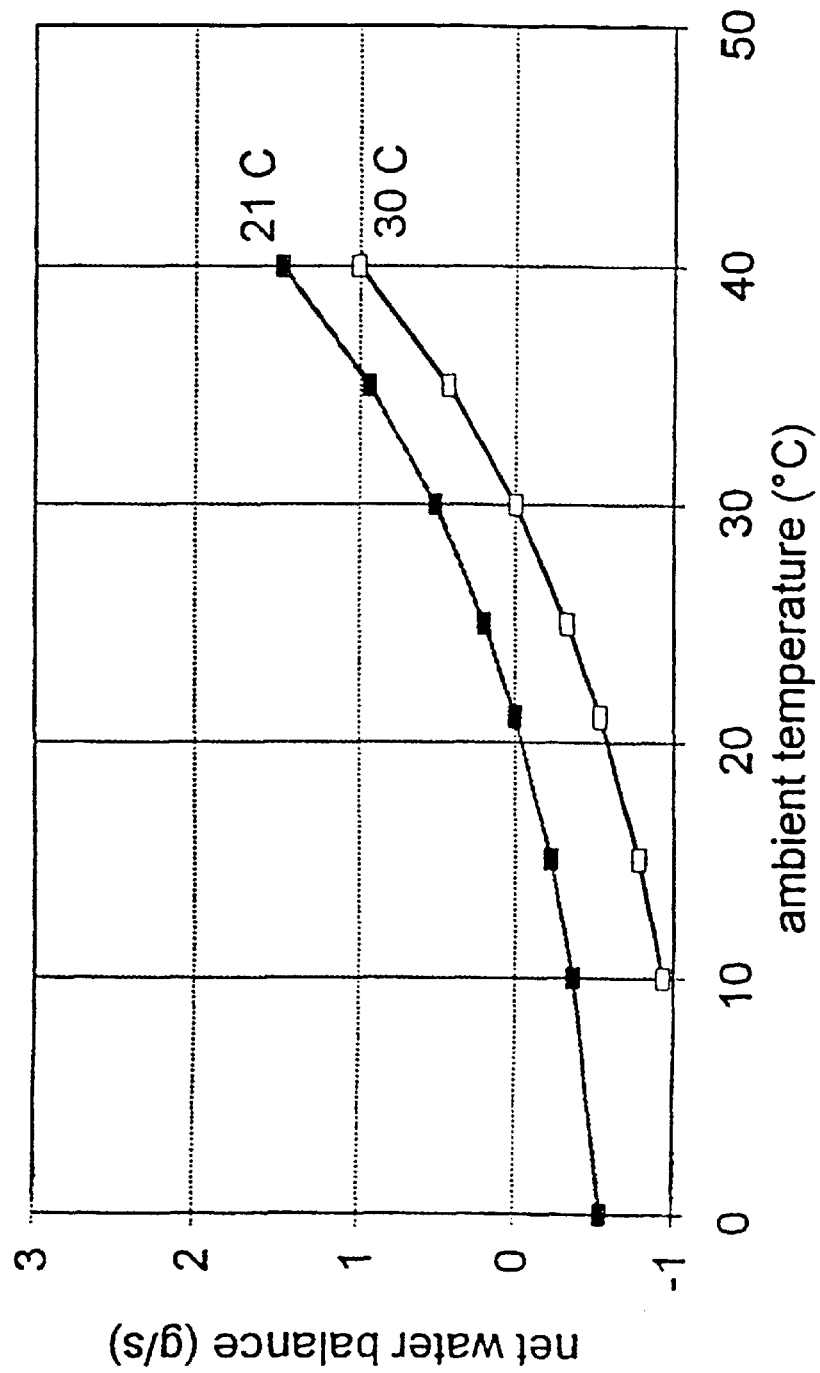
FIG. 4 is a graphical representation of net water balance for two systems showing the effect of ambient temperature.
Figure 5:
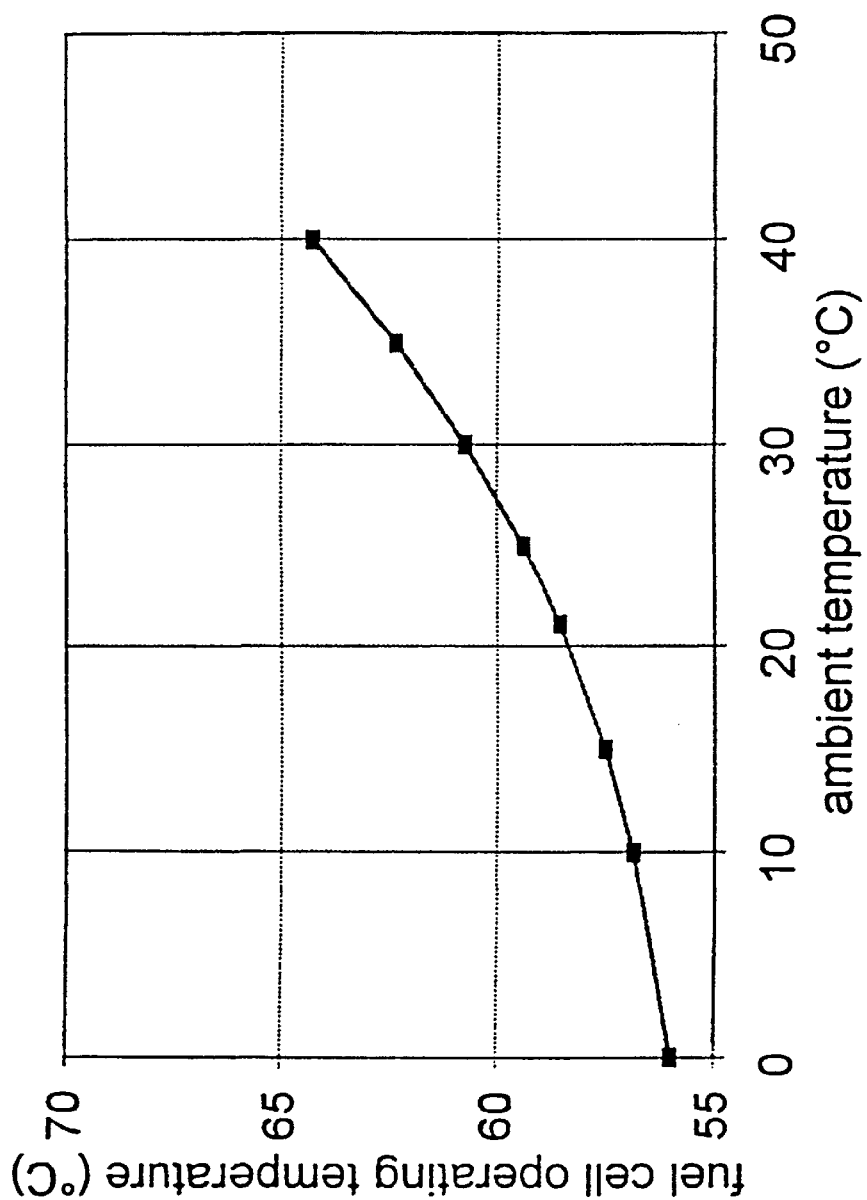
FIG. 5 is a graphical representation of fuel cell operating temperature versus ambient temperature.
Figure 6:
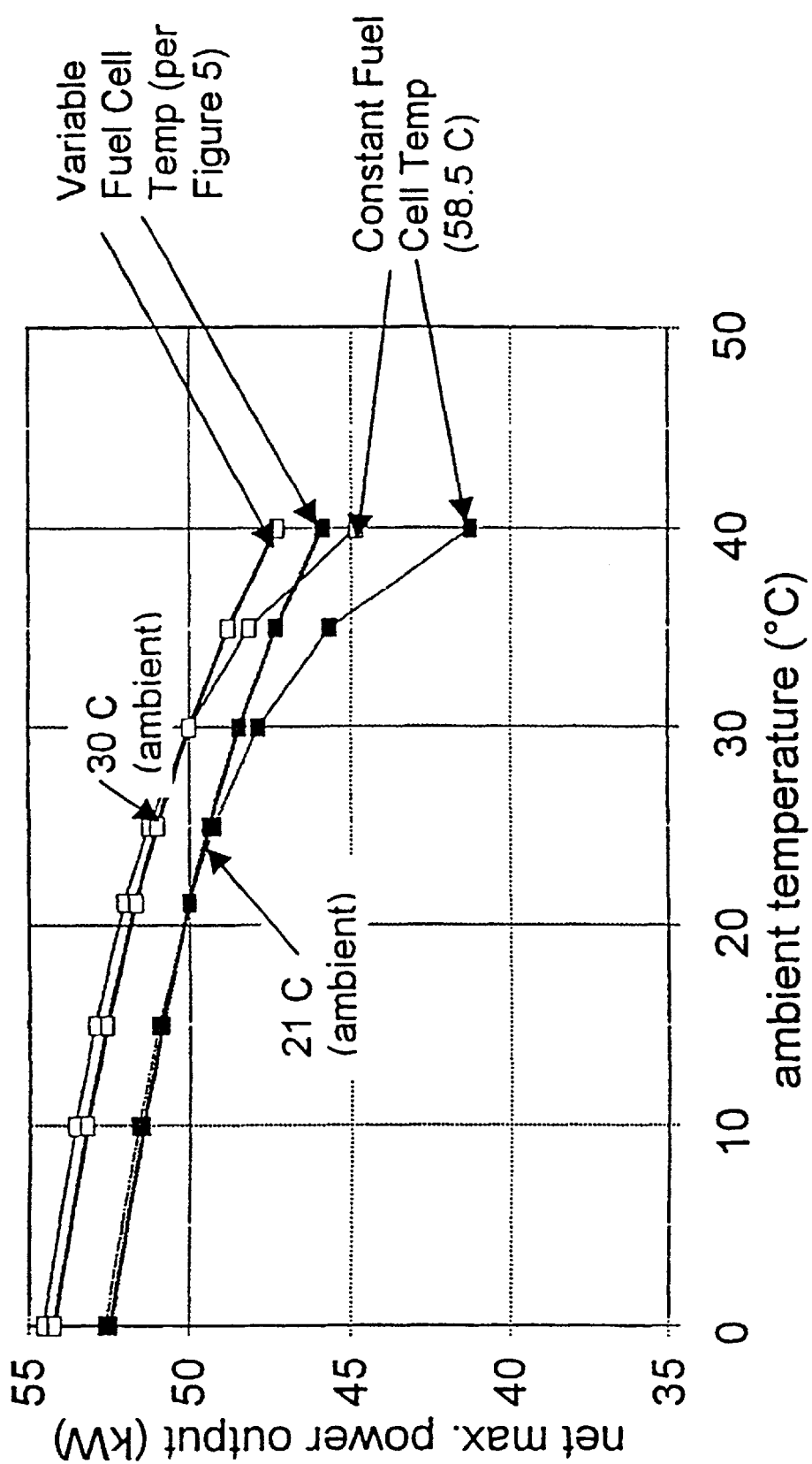
FIG. 6 is a graphical representation showing the derating effect of ambient temperature for the two systems depicted in FIG. 4, one with constant fuel cell operating temperature, and the other with variable temperature as depicted in FIG. 5.

In a further embodiment of the invention, the fuel cell operating temperature can be varied in response to a measured ambient temperature. Changes in ambient temperature affect fuel cell system performance with regard to process water balance and net power output. At the design point (e.g., 50 $kW_{net}$ system operating as 58.5 degrees C. and ambient conditions of 30 degrees C., 1 atm pressure and 60% R.H.), water balance is neutral. For a fuel cell system that operates at a higher ambient temperature than the reference temperature, there is a net water production in the system, and vice versa at lower ambient temperature (e.g., see FIG. 4) at constant ambient relative humidity. In addition, at higher ambient temperature, the fuel cell system is derated since lesser net power is achievable due to higher parasitic loads, particularly the radiator and compressor (e.g., see the constant temperature line in FIG. 6). By varying the fuel cell operating temperature in response to ambient temperature (i.e., higher fuel cell stack temperature at higher ambient conditions, and vice versa at lower ambient air temperature) the process water balance is in closed loop and there is no consumption/production of water (e.g., see FIG. 5). Referring now to FIG. 6 ("adjusted" lines), derating is minimized by varying the fuel cell stack temperature.

Preferred embodiments have been described with a relatively high degree of particularity. This description is intended only as examples. The invention can be embodied in many other forms. Accordingly, the scope of the invention should not be assessed by the preceding disclosure, but rather a reasoned reading of the following claims in accordance with the law.

What is claimed is:

1. A fuel cell assembly, comprising:
   a fuel cell;
   a water reservoir for receiving and temporarily storing water from exhaust of the fuel cell, said water reservoir supplying water to the fuel cell;
   a fuel cell cooling system for controlling the operating temperature of the fuel cell;
   a water balance control system, including:
      at least one of sensors from the group of:
         a temperature sensor operatively connected to the fuel cell for producing a fuel cell operating temperature signal corresponding the operating temperature of the fuel cell;
         a temperature sensor for producing an ambient temperature signal corresponding to the temperature of ambient air surrounding the fuel cell assembly;
         a pressure sensor operatively connected to the fuel cell for producing a fuel cell operating pressure signal corresponding the operating pressure of the fuel cell;
         a load sensor operatively connected to the fuel cell for producing a fuel cell operating load signal corresponding the operating load being placed on the fuel cell;

a water level sensor operatively connected to the water reservoir for producing a water level signal corresponding to water quantity in the water reservoir; and a water balance controller for adjusting the operating temperature of the fuel cell responsive to at least one of said signals, said water balance control device adjusting said operating temperature by controlling said fuel cell cooling system.

2. The assembly according to claim 1, wherein said water balance controller adjusts the operating temperature of the fuel cell through control of the fuel cell cooling system, responsive to said water level signal to maintain the water quantity in the water reservoir within a predetermined range, selectively corresponding to a neutral water balance for said fuel cell at a given operating temperature, operating pressure and fuel cell load.

3. The assembly according to claim 1, wherein said water balance controller activates and deactivates the coolant system responsive to said fuel cell operating temperature signal to maintain the water quantity in the water reservoir at a predetermined level, selectively corresponding to a neutral water balance for said fuel cell at a given operating temperature, operating pressure and fuel cell load.

4. The assembly according to claim 1, wherein the coolant system includes:

a coolant;

a coolant passage for routing the coolant into and out of the fuel cell;

a coolant temperature controller along said coolant passage to selectively reduce the temperature of the coolant; and a pump for supplying the coolant to the fuel cell.

5. The assembly according to claim 1, wherein the fuel cell coolant system includes a radiator and cooling fan to transfer heat from the fuel cell.

6. A method of controlling water quantity in a fuel cell system, said fuel cell system having a fuel cell; a water reservoir for receiving water exhausted from the fuel cell and to supply water to the fuel cell; a fuel cell cooling system; a water level sensor operatively connected to the water reservoir for producing a water level signal corresponding to water quantity in the water reservoir, a water balance controller for adjusting an operating temperature of the fuel cell through the cooling system responsive to the water level sensor, said method comprising the steps of:

sensing a water level in the water reservoir;

producing a water level signal corresponding to water quantity in the water reservoir;

comparing the water level signal to a reference signal corresponding to a predetermined range of levels, signifying neutral water balance in the fuel cell system;

adjusting the operating temperature of the fuel cell, whereby the water consumption and production of the fuel cell is altered to return the water level to one corresponding to neutral water balance.

7. The method of claim 6, wherein the operating temperature of the fuel cell is below 60 degrees C. when the ambient temperature is approximately 30 degrees C., 60% R.H. and 1 atm pressure.

8. A method of controlling water quantity in a fuel cell system, said fuel cell system having a fuel cell; a water reservoir for receiving water exhausted from the fuel cell and to supply water to the fuel cell; a fuel cell cooling system; a water balance controller for adjusting an operating temperature of the fuel cell through the cooling system, said method comprising the steps of:

providing at least one sensor from the group of: a temperature sensor operatively connected to the fuel cell for producing a fuel cell operating temperature signal corresponding the operating temperature of the fuel cell; a second temperature sensor for producing an ambient temperature signal corresponding to the temperature of ambient air surrounding the fuel cell assembly; a pressure sensor operatively connected to the fuel cell for producing a fuel cell operating pressure signal corresponding the operating pressure of the fuel cell; a load sensor operatively connected to the fuel cell for producing a fuel cell operating load signal corresponding the operating load being placed on the fuel cell;

sensing a parameter from said at least one sensors;

producing at least one sensor signal from said at least sensor corresponding to said sensed parameter;

adjusting the operating temperature of the fuel cell, whereby the water consumption and production of the fuel cell is altered to return the water level to one corresponding to neutral water balance, response to said at least one sensor.

* * * * *